(12) United States Patent
Takada

(10) Patent No.: US 12,151,700 B2
(45) Date of Patent: Nov. 26, 2024

(54) VEHICLE, VEHICLE CONTROL METHOD, AND NON-TRANSITORY RECORDING MEDIUM

(71) Applicant: TOYOTA JIDOSHA KABUSHIKI KAISHA, Toyota (JP)

(72) Inventor: Arata Takada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 17/887,894

(22) Filed: Aug. 15, 2022

(65) Prior Publication Data

US 2023/0105600 A1 Apr. 6, 2023

(30) Foreign Application Priority Data

Oct. 5, 2021 (JP) ................................. 2021-164282

(51) Int. Cl.
*B60W 50/14* (2020.01)
*B60W 60/00* (2020.01)

(52) U.S. Cl.
CPC ........ *B60W 50/14* (2013.01); *B60W 60/0051* (2020.02); *B60W 2050/146* (2013.01); *B60W 2540/223* (2020.02)

(58) Field of Classification Search
CPC ............. B60W 50/14; B60W 60/0051; B60W 2050/146; B60W 2540/223; B60W 60/0053; B60W 60/0057
See application file for complete search history.

(56) References Cited

U.S. PATENT DOCUMENTS

| 2018/0272895 | A1* | 9/2018 | Schmidt ............ B60W 60/0057 |
| 2018/0345889 | A1* | 12/2018 | Pinkelman ............. B60N 2/002 |
| 2020/0307644 | A1 | 10/2020 | Hattori et al. |
| 2021/0016804 | A1 | 1/2021 | Hara et al. |
| 2021/0206393 | A1* | 7/2021 | Yang ..................... B60W 40/08 |
| 2023/0068393 | A1* | 3/2023 | Hannig ................ B60N 2/0228 |

FOREIGN PATENT DOCUMENTS

JP 2020-157832 A 10/2020
JP 2021-17112 A 2/2021

* cited by examiner

*Primary Examiner* — Faris S Almatrahi
*Assistant Examiner* — Dana F Artimez
(74) *Attorney, Agent, or Firm* — Oliff PLC

(57) ABSTRACT

A vehicle including at least one movable member whose position is modifiable by an occupant, a driving assist system capable of executing driving assist control that is interruptible when an interrupt condition has been satisfied, and a processor. The processor is configured to control an alarm device so as to issue a warning to a driver when determined that a prescribed positional condition has been satisfied based on a reference position and a position of each of the movable members when the driving assist control is being executed.

8 Claims, 5 Drawing Sheets

VEHICLE, VEHICLE CONTROL METHOD, AND NON-TRANSITORY RECORDING MEDIUM

CROSS-REFERENCE TO RELATED APPLICATION

This application is based on and claims priority under 35 USC 119 from Japanese Patent Application No. 2021-164282 filed on Oct. 5, 2021, the disclosure of which is incorporated by reference herein.

BACKGROUND

Technical Field

The present disclosure relates to a vehicle, a vehicle control method, and a non-transitory recording medium.

Related Art

A vehicle is disclosed in Japanese Patent Application Laid-Open (JP-A) No. 2020-157832. In this vehicle an alarm notifying that an occupant will become an operator is issued to the occupant when the vehicle has been switched from a driving assist state in which driving assist control is being executed, to a non-assist state in which driving assist control is not being executed.

The invention of JP-A No. 2020-157832 has room for improvement in relation to quick return of the occupant to a posture enabling manual driving execution when the vehicle has been switched from the driving assist state to the non-assist state.

In consideration of the above circumstances, an object of the present disclosure is to obtain a vehicle, a vehicle control method, and a non-transitory recording medium that enable the occupant to quickly return to a posture enabling manual driving execution when the vehicle has been switched from the driving assist state to the non-assist state.

SUMMARY

A vehicle according to a first aspect of the present disclosure includes at least one movable member whose position is changeable by an occupant, a driving assist system capable of executing driving assist control that is interruptible when an interrupt condition has been satisfied, and a processor. The processor controls an alarm device so as to issue a warning to a driver when it has been determined that a prescribed positional condition has been satisfied based on a reference position and a position of each of the at least one movable member when the driving assist control is being executed.

In the vehicle according to the first aspect of the present disclosure, the alarm device issues a warning to a driver when determined that a prescribed positional condition has been satisfied based on the reference position and the position of each of the at least one movable member when driving assist control is being executed. There is accordingly a high likelihood that the occupant who has received the warning moves each of the movable members in the direction toward their respective reference positions. The first aspect of the present disclosure accordingly enables the occupant to quickly return to a posture enabling manual driving execution when the vehicle has been switched from the driving assist state to the non-assist state.

A vehicle according to a second aspect of the present disclosure is the first aspect of the present disclosure, wherein the processor computes a first return time that is a time needed to move every movable member to its respective reference position based on the position and the reference position of each movable member, and determines that the positional condition has been satisfied when it has been determined that the first return time is equal to or greater than a first threshold while the driving assist control is being executed.

In the second aspect of the present disclosure, the processor computes the first return time that is the time needed to move every movable member to its respective reference position based on the position and the reference position of each movable member. The processor also determines the positional condition has been satisfied when it has been determined that the first return time is equal to or greater than a first threshold while the driving assist control is being executed. The second aspect of the present disclosure accordingly enables the occupant to quickly return to a posture enabling manual driving execution when the vehicle has been switched from the driving assist state to the non-assist state.

A vehicle according to a third aspect of the present disclosure is the first aspect of the present disclosure wherein the processor computes second return time based on a position and a reference position of a particular movable member that is one movable member of a plurality of the at least one movable member, the second return time being a time needed to move the particular movable member to the reference position, and determines that the positional condition has been satisfied when it has been determined that the second return time is equal to or greater than a second threshold while the driving assist control is being executed.

In the third aspect of the present disclosure, based on the position and the reference position of the particular movable member that is one movable member of a plurality of the at least one movable member, the processor computes the second return time that is the time needed to move the particular movable member to the reference position. The processor also determines that the positional condition has been satisfied when it has been determined that the second return time is equal to or greater than a second threshold while the driving assist control is being executed. The third aspect of the present disclosure accordingly enables the occupant to quickly return to a posture enabling manual driving execution when the vehicle has been switched from the driving assist state to the non-assist state.

The vehicle according to a fourth aspect of the present disclosure is the first aspect of the present disclosure further including a movement restricting device to restrict each of the at least one movable member from moving in a direction away from its respective reference position when it has been determined that the positional condition has been satisfied.

In the fourth aspect of the present disclosure, the movement restricting device restricts each of the at least one movable member from moving in a direction away from its respective reference position when it has been determined that the positional condition has been satisfied. In the fourth aspect of the present disclosure, a likelihood that the occupant is able to quickly return to a posture enabling manual driving execution when the vehicle has been switched from the driving assist state to the non-assist state is accordingly higher than in cases in which each of the movable members is able to move in directions away from their reference positions when determined that the positional condition has been satisfied.

A vehicle according to a fifth aspect of the present disclosure is the first aspect of the present disclosure wherein the movable member is at least one selected from the group consisting of a seat cushion of a driving seat that is able to slide with respect to a vehicle body of the vehicle, a seatback connected to a seat cushion of a driving seat so as to be able to rotate, a steering wheel that is able to move along its own rotation center axis, a brake pedal that is able to move in a direction intersecting a pedal-depress direction, an accelerator pedal that is able to move in a direction intersecting the pedal-depress direction, a side mirror that is able to move with respect to the vehicle body, and a rearview mirror that is able to move with respect to the vehicle body.

In the fifth aspect of the present disclosure, there is a high likelihood that at least one out of the seat cushion, the seatback, the steering wheel, the brake pedal, the accelerator pedal, the side mirror, or the rearview mirror is at a position easy for manual operation by the occupant when the positional condition has been satisfied.

The vehicle according to a sixth aspect of the present disclosure is the first aspect of the present disclosure wherein the reference position is a position of each of the at least one movable member when the vehicle was switched from a non-assist state in which the driving assist control is not being executed to a driving assist state in which the driving assist control is being executed.

In the sixth aspect of the present disclosure, the reference position of each of the at least one movable member is the position of each of the at least one movable member when the vehicle was switched from the non-assist state to the driving assist state in which the driving assist control is being executed. Namely, the position of each of the at least one movable member immediately prior to execution of driving assist control is taken as the reference position. The position of each of the at least one movable member immediately prior to execution of driving assist control is highly likely to be a position easy for the occupant to execute manual driving. There is accordingly a high likelihood that the occupant will be able to execute manual driving comfortably in cases in which the occupant who has received a warning has moved the movable members to their reference positions.

A vehicle according to a seventh aspect of the present disclosure is the first aspect of the present disclosure wherein each of the at least one movable member is able to move under drive force of an actuator controlled by the processor; and the reference position is a pre-recorded position to which each of the at least one movable member is moved under drive force of the actuator when an operation device provided at the vehicle has been operated by the occupant.

In the seventh aspect of the present disclosure the pre-recorded position each of the at least one movable member is moved to under drive force of the actuator when the operation device provided to the vehicle has been operated is the reference position of each of the movable members. The pre-recorded position of each of the at least one movable member is highly likely to be a position easy for the occupant to execute manual driving. This means that there is a high likelihood that the occupant will be able to execute manual driving comfortably when the occupant who has received the warning has moved the movable members to their reference positions.

A vehicle control method according to an eighth aspect of the present disclosure includes, by a processor, when a vehicle including at least one movable member is executing driving assist control that is interruptible when an interrupt condition has been satisfied, controlling an alarm device so as to issue a warning to a driver when it has been determined that a prescribed positional condition has been satisfied based on a position and a reference position of each of the at least one movable member.

A non-transitory recording medium according to a ninth aspect of the present disclosure is a non-transitory recording medium storing a computer-executable program executable by a processor to perform processing. The processing includes, when a vehicle including at least one movable member is executing driving assist control that is interruptible when an interrupt condition has been satisfied, controlling an alarm device so as to issue a warning to a driver when it has been determined that a prescribed positional condition has been satisfied based on a position and a reference position of each of the at least one movable member.

As explained above, the vehicle, the vehicle control method, and the non-transitory recording medium according to the present disclosure exhibit the excellent advantageous effect of enabling an occupant to quickly return to a posture enabling manual driving execution when the vehicle has been switched from the driving assist state to the non-assist state.

BRIEF DESCRIPTION OF THE DRAWINGS

Exemplary embodiments of the present invention will be described in detail based on the following figures, wherein.

DETAILED DESCRIPTION

Explanation follows regarding a vehicle 10, a vehicle control method, and a non-transitory recording medium according to an exemplary embodiment of the present disclosure, with reference to the appended drawings. Note that as appropriate in each of the drawings an arrow FR indicates a vehicle forward direction, an arrow UP indicates a vehicle upward direction, and an arrow LH indicates a left side in a vehicle left-right direction (vehicle width direction). In the following, simple reference in the description to front-rear, left-right, and vertical directions respectively indicate the front-rear in the vehicle front-rear direction, left-right in the vehicle left-right direction (vehicle width direction), and vertical in the vehicle vertical direction.

Figure 1:
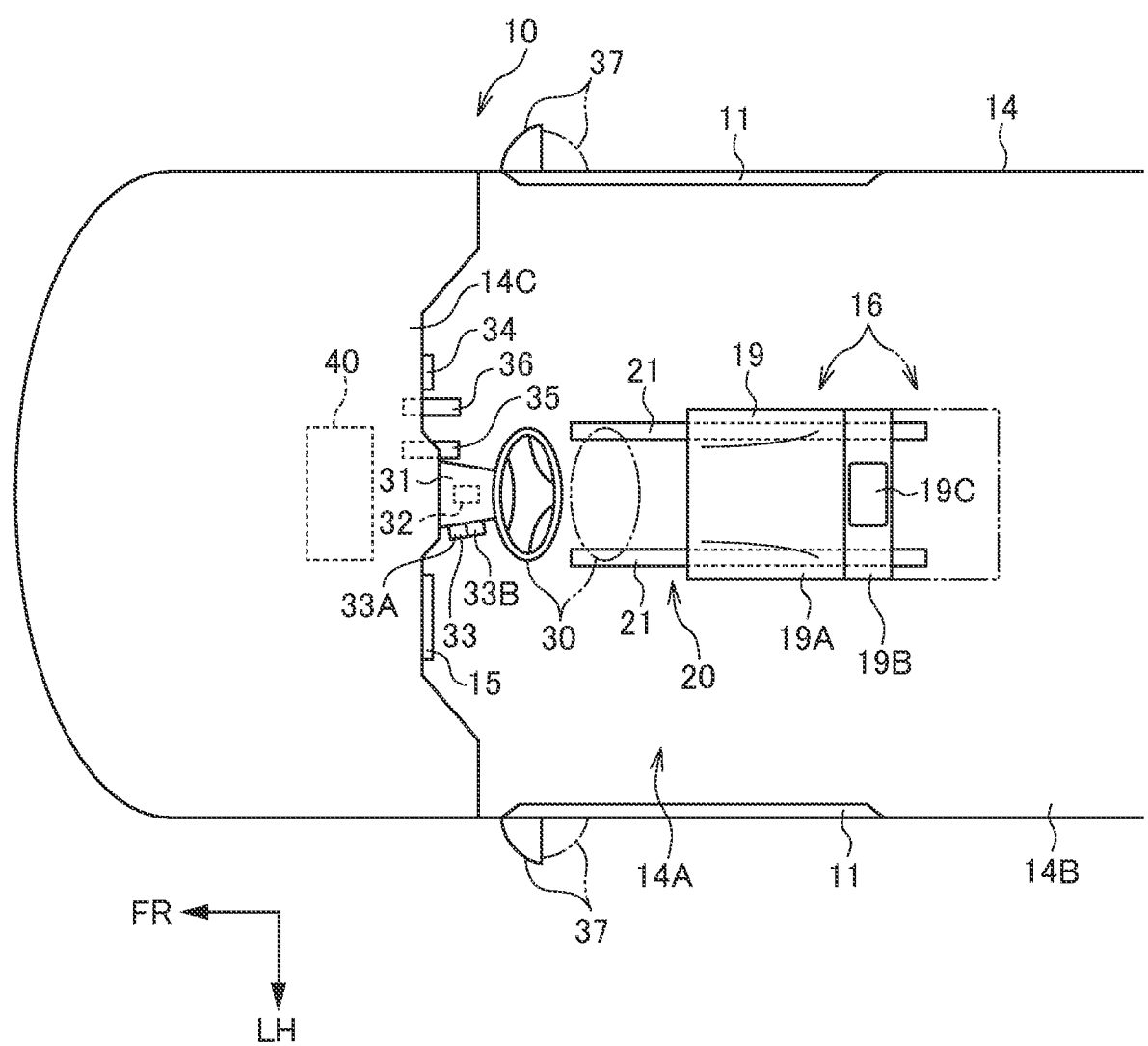
FIG. 1 is a schematic plan view illustrating a vehicle according to an exemplary embodiment, with a ceiling section omitted.
Figure 2:
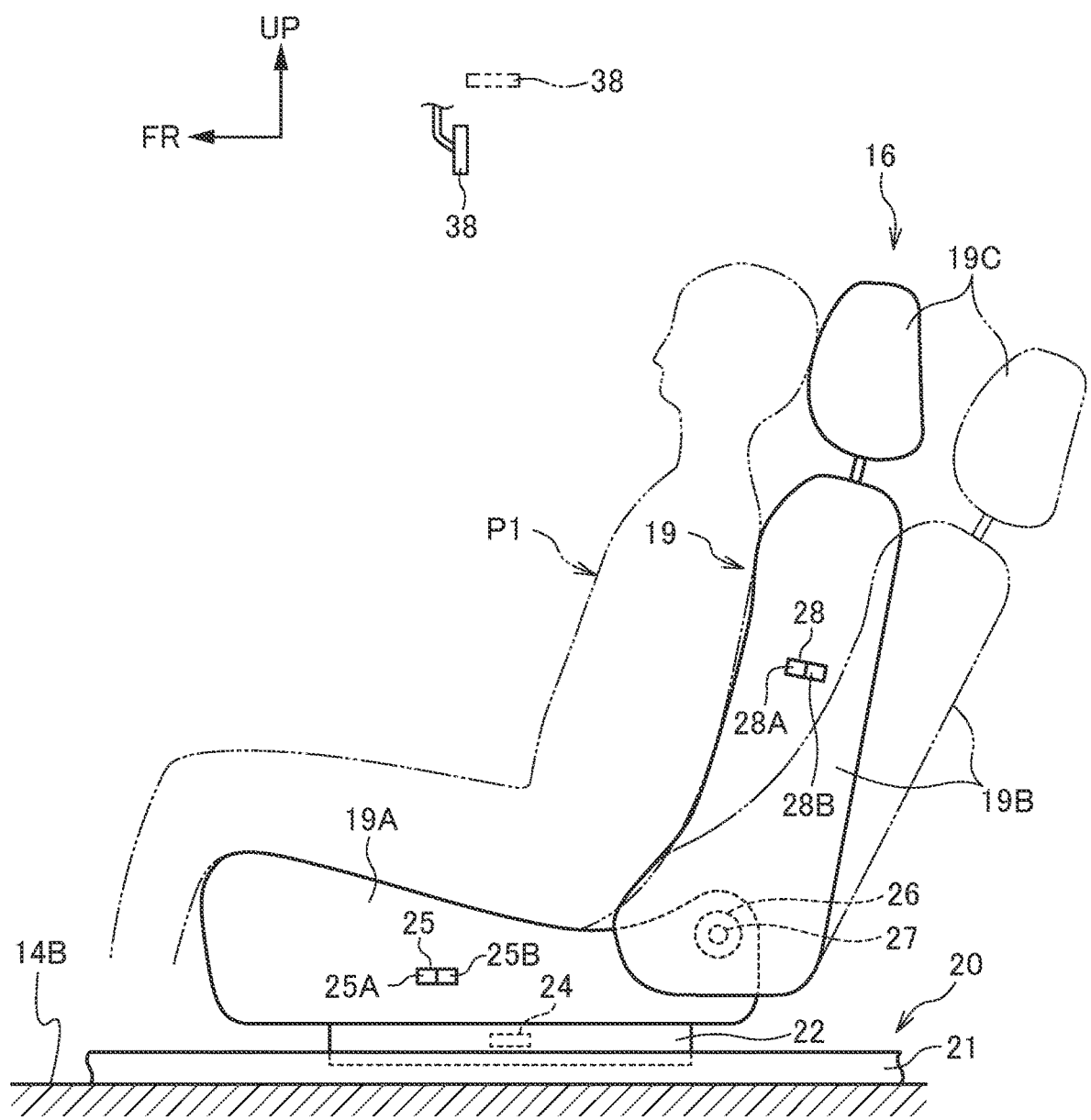
FIG. 2 is a schematic side view of a driving seat of the vehicle illustrated in FIG. 1.

As illustrated in FIG. 1, an instrument panel 14C of a vehicle body 14 of the vehicle 10 is provided with a touch panel display (alarm device) (operation device) 15 and a steering wheel 30. A driving seat 16 is also provided at a central portion in the vehicle width direction of a floor 14B, which is the bottom face of a vehicle cabin 14A. As illustrated in FIG. 2, an occupant P1 is able to sit in the driving seat 16. The driving seat 16 includes a seat body 19 and a slide-rail device 20.

As illustrated in FIG. 2, the slide rail device 20 is provided to the floor 14B to support a seat body 19 of the driving seat 16 so as to enable sliding in the front-rear direction. The slide rail device 20 includes a left-right pair of lower rails 21 extending along the front-rear direction and fixed to the floor 14B, and a left-right pair of upper rails 22 supported by the respective lower rails 21 so as to be able to slide in the front-rear direction. The slide rail device 20 also includes a first actuator 24 configured by an electric pulse motor, and a motive force transmission mechanism (not illustrated in the drawings).

The seat body 19 is supported by the left-right upper rails 22. The seat body 19 includes a seat cushion (movable member) 19A, a seatback (movable member) 19B, and a headrest 19C. The seat cushion 19A is fixed to upper end portions at the front and rear of the upper rails 22.

As illustrated in FIG. 2, a first switch 25 is provided to a side face of the seat cushion 19A. The first switch 25 is a see-saw switch capable of swinging about a swinging center provided at a central portion of the first switch 25. The first switch 25 is positioned at an initial position when external force is not being given to the first switch 25. When a front portion 25A of the first switch 25 is pressed the first switch 25 moves to a first position, and when a rear portion 25B is pressed the first switch 25 moves to a second position. The first actuator 24 and the first switch 25 are connected to an ECU 40, described later. When the first switch 25 moves to the first position, the first actuator 24 generates a drive force while rotating forward under control from the ECU 40. This drive force is transmitted from the motive force transmission mechanism to the upper rails 22, and the upper rails 22 slide forward with respect to the lower rails 21. When the first switch 25 moves to the second position, the first actuator 24 generates a drive force while rotating in reverse. This drive force is transmitted from the motive force transmission mechanism to the upper rails 22, and the upper rails 22 slide rearward with respect to the lower rails 21.

As illustrated in FIG. 2, a rear end portion of the seat cushion 19A and a lower end portion of the seatback 19B are connected together through a reclining mechanism 26 so as to enable rotation. A second actuator 27 configured by an electric pulse motor is provided to the reclining mechanism 26.

As illustrated in FIG. 2, a second switch 28 is provided to a side face of the seatback 19B. The second switch 28 is a see-saw switch capable of swinging about a swinging center provided at a central portion of the second switch 28. The second switch 28 is positioned at an initial position when external force is not being given to the second switch 28. When a front portion 28A of the second switch 28 is pressed the second switch 28 moves to a first position, and when a rear portion 28B is pressed the second switch 28 moves to a second position. The second actuator 27 and the second switch 28 are connected to the ECU 40. When the second switch 28 moves to the first position, the second actuator 27 generates a drive force while rotating forward under control from the ECU 40. The reclining mechanism 26 is rotated by this drive force, and the seatback 19B rotates forward relative to the seat cushion 19A. When the second switch 28 moves to the second position, the second actuator 27 generates a drive force while rotating in reverse. The reclining mechanism 26 is rotated by this drive force, and the seatback 19B rotates rearward relative to the seat cushion 19A.

As illustrated in FIG. 1, a steering wheel (movable member) 30 is supported by a rear end portion of a support mechanism 31 provided to the instrument panel 14C. The steering wheel 30 is able to rotate about its own rotation center axis. This rotation center axis extends in a front-rear direction in plan view. The support mechanism 31 is able to extend and retract along the rotation center axis of the steering wheel 30. A steering mechanism incorporating the steering wheel 30 of the present exemplary embodiment is a steer-by-wire steering mechanism. A third actuator 32 configured by an electric pulse motor and a motive force transmission mechanism (not illustrated in the drawings) is provided inside the support mechanism 31.

As illustrated in FIG. 1, a third switch 33 is provided to a side face of the support mechanism 31. The third switch 33 is a see-saw switch capable of swinging about a swinging center provided at a central portion of the third switch 33. The third switch 33 is positioned at an initial position when external force is not being given to the third switch 33. When a front portion 33A of the third switch 33 is pressed the third switch 33 moves to a first position, and when a rear portion 33B is pressed the third switch 33 moves to a second position. The third actuator 32 and the third switch 33 are connected to the ECU 40. When the third switch 33 moves to the first position, the third actuator 32 generates a drive force while rotating forward under control from the ECU 40. This drive force is transmitted from the motive force transmission mechanism to the support mechanism 31, and the support mechanism 31 retracts such that the steering wheel 30 moves forward. When the third switch 33 moves to the second position, the third actuator 32 generates a drive force while rotating in reverse. When this drive force is transmitted from the motive force transmission mechanism to the support mechanism 31, the support mechanism 31 extends and the steering wheel 30 moves rearward.

As illustrated in FIG. 1, a driving assist switch 34 is provided to the instrument panel 14C. Moreover, as illustrated in FIG. 1 and FIG. 2, a brake pedal 35, an accelerator pedal 36, side mirrors 37, and a rearview mirror 38 are provided to the vehicle 10. The brake pedal 35 and the accelerator pedal 36 are able to move to-and-fro along a prescribed pedal-depress direction. The brake pedal 35 and the accelerator pedal 36 are also able to move in a direction intersecting the pedal-depress direction. For example, the brake pedal 35 and the accelerator pedal 36 are able to move in the left-right direction. The left-right side mirrors 37 are supported by left-right side doors 11 so as to be able to rotate about rotation axes running along substantially vertical directions. Namely, the side mirrors 37 are each able to rotate between an in-use position illustrated by solid lines in FIG. 1, and a folded-in position illustrated by double-dot broken lines therein. The rearview mirror 38 is supported at an inside face of a ceiling section so as to able to rotate about a rotation axis running along a substantially left-right direction. Namely, the rearview mirror 38 is able to rotate between the in-use position where the mirror is facing rearward illustrated by solid lines in FIG. 2, and a folded away position where the mirror is facing toward the inside face of the ceiling section illustrated by double-dot broken lines in FIG. 2.

Figure 3:
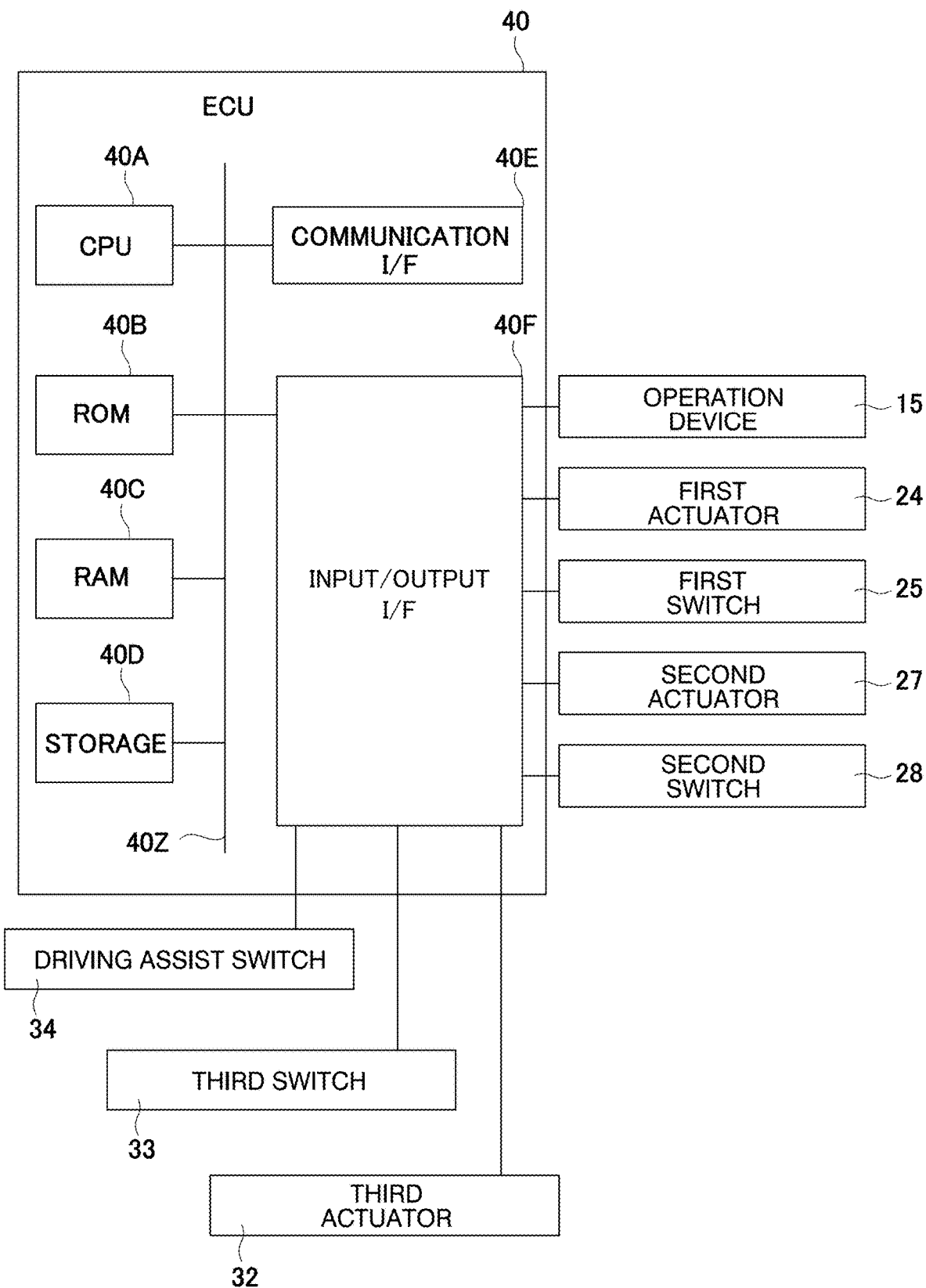
FIG. 3 is a schematic block diagram illustrating an ECU of the vehicle illustrated in FIG. 1.

As illustrated in FIG. 1, the ECU (computer) 40 is provided to the vehicle 10. The ECU 40 is electrically connected to a display 15, the first actuator 24, the first switch 25, the second actuator 27, the second switch 28, the third actuator 32, the third switch 33, and the driving assist switch 34. As illustrated in FIG. 3, the ECU 40 is configured including a central processing unit (CPU: processor) 40A, read only memory (ROM) 40B serving as a non-transitory recording medium (recording medium), random access memory (RAM) 40C, storage 40D serving as a non-transitory recording medium (recording medium), a communication interface (I/F) 40E, and an input/output I/F 40F. The CPU 40A, the ROM 40B, the RAM 40C, the storage 40D, the communication I/F 40E, and the input/output I/F 40F are connected together through a bus 40Z so as be able to communicate with each other.

The CPU 40A is a central processing unit that executes various programs and controls each configuration section. Namely, the CPU 40A reads a program from the ROM 40B or the storage 40D, and executes the program using the RAM 40C as workspace. The CPU 40A controls each configuration and performs various arithmetic processing according to a program stored on the ROM 40B or the storage 40D.

The ROM 40B is stored with various programs and various data. The RAM 40C serves as workspace to temporarily store programs and data. The storage 40D is configured by a storage device, such as a hard disk drive (HDD) or a solid state drive (SSD), and stores various programs and various data. The communication I/F 40E is an interface for the ECU 40 to communicate with another devices. The input/output I/F 40F is an interface for communicating with various devices.

Figure 4:
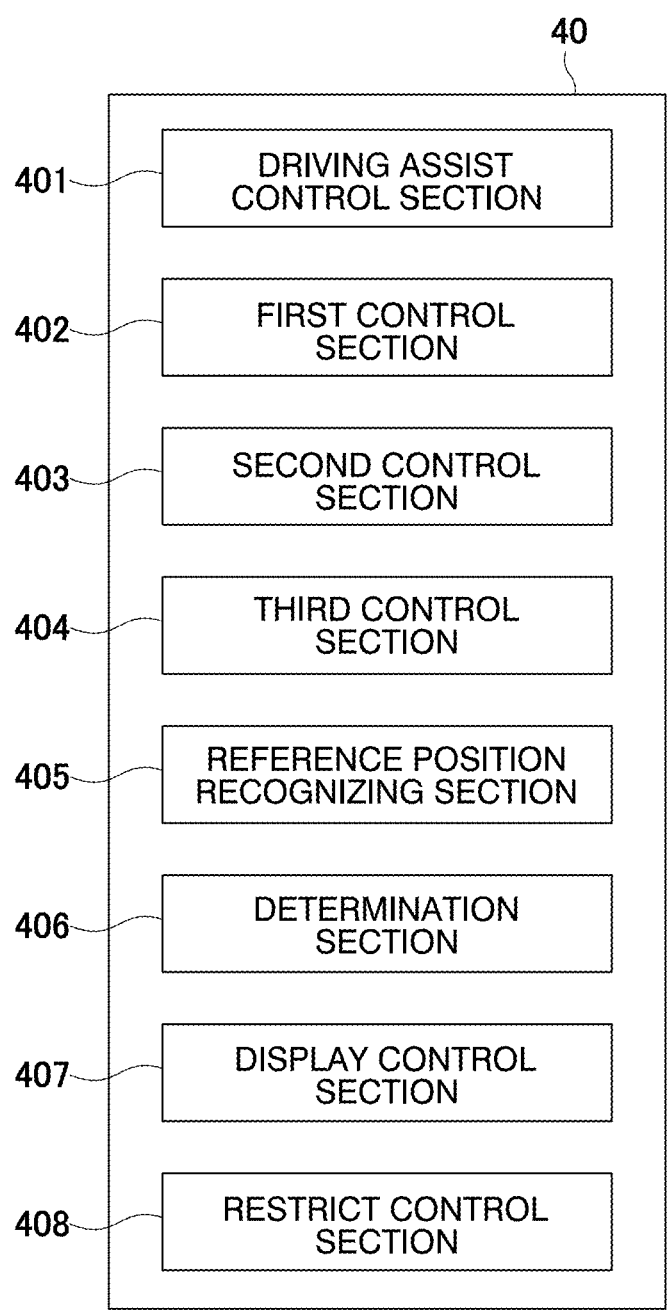
FIG. 4 is a functional block diagram of the ECU illustrated in FIG. 3.

As illustrated in FIG. 4, the ECU 40 includes, as functional configuration, a driving assist control section (driving assist system) 401, a first control section 402, a second control section 403, a third control section 404, a reference position recognizing section 405, a determination section 406, a display control section 407, and a restrict control section (movement restricting device) 408. The driving assist control section 401, the first control section 402, the second control section 403, the third control section 404, the reference position recognizing section 405, the determination section 406, the display control section 407, and the restrict control section 408 are implemented by the CPU 40A reading a program stored on the ROM 40B or the storage 40D, and executing the program.

The driving assist control section 401 functions when the driving assist switch 34 positioned at an OFF position has moved to an ON position. The driving assist control section 401 executes driving assist control by operating devices in the vehicle 10, including a braking device, an engine, and the steering wheel 30. Reference in the present specification to "driving assist control" encompasses driving assist control of level 1 to level 5 automation in the driving automation scale as defined by the Society of Automotive Engineers (SAE). The occupant P1 is able to cause a desired level of driving assist control to be executed in the vehicle 10 by operating the driving assist switch 34 that has been moved to the ON position. The driving assist control section 401 recognizes the level of driving assist control selected by the occupant P1.

The occupant P1 does not need to execute manual driving (driving operations) and does not need to visually monitor the surroundings of the vehicle 10 when driving assist control of level 3 or level 4 is being executed. However, during execution of driving assist control of level 3 or level 4 the driving assist control section 401 interrupts the driving assist control of level 3 or level 4 when determined that an interrupt condition has been satisfied. For example, such an interrupt condition is satisfied when a prescribed state has arisen in a sensor device mounted to the vehicle 10 or in the surrounding environment of the vehicle 10. In cases in which the driving assist control section 401 has interrupted the driving assist control of level 3 or level 4, the vehicle 10 is switched from a driving assist state in which driving assist control is executed to a non-assist state in which driving assist control is not executed. The occupant P1 needs to immediately perform manual driving when the vehicle 10 has switched to the non-assist state. Namely, the occupant P1 needs to operate plural operation members, including the steering wheel 30, the brake pedal 35, the accelerator pedal 36, a shift lever, and direction indicators, and also needs to visually monitor the surroundings of the vehicle 10.

The first control section 402 transmits a forward signal (pulse signal) to the first actuator 24 while the first switch 25 is positioned at the first position. The first control section 402 transmits a reverse signal (pulse signal) to the first actuator 24 while the first switch 25 is positioned at the second position. The first control section 402 does not transmit a pulse signal to the first actuator 24 while the first switch 25 is positioned at the initial position. Moreover, the first control section 402 recognizes a front-rear direction position of the seat cushion 19A of the seat body 19 (i.e. the upper rails 22) based on a pulse number of the pulse signal transmitted to the first actuator 24.

The second control section 403 transmits a forward signal (pulse signal) to the second actuator 27 while the second switch 28 is positioned at the first position. The second control section 403 transmits a reverse signal (pulse signal) to the second actuator 27 while the second switch 28 is positioned at the second position. The second control section 403 does not transmit a pulse signal to the second actuator 27 while the second switch 28 is positioned at the initial position. Furthermore, the second control section 403 recognizes a rotation position (rotation angle) of the seatback 19B with respect to the seat cushion 19A based on a pulse number of the pulse signal transmitted to the second actuator 27.

The third control section 404 transmits a forward signal (pulse signal) to the third actuator 32 while the third switch 33 is positioned at the first position. The third control section 404 transmits a reverse signal (pulse signal) to the third actuator 32 while the third switch 33 is positioned at the second position. The third control section 404 does not transmit a pulse signal to the third actuator 32 while the third switch 33 is positioned at the initial position. Moreover, the third control section 404 recognizes a front-rear direction position of the steering wheel 30 with respect to the instrument panel 14C based on a pulse number of the pulse signal transmitted to the third actuator 32.

The reference position recognizing section 405 recognizes the positions of the seat cushion 19A, the seatback 19B, and the steering wheel 30 at a switching time point. This switching time point is the time when the occupant P1 executing manual driving has operated the driving assist switch 34 and started driving assist control of level 3 or level 4 in the vehicle 10, or the time when the occupant P1 has operated the driving assist switch 34 and started driving assist control of level 3 or level 4 in the vehicle 10 executing driving assist control of level 1, level 2, or level 5. The positions of the seat cushion 19A, the seatback 19B, and the steering wheel 30 at the switching time point are called "reference positions". Namely, the reference position of the seat cushion 19A, the reference position of the seatback 19B, and the reference position of the steering wheel 30 differ from each other. Note that the reference position recognizing section 405 recognizes the reference positions of the seat cushion 19A, the seatback 19B, and the steering wheel 30 based on the positions of the seat cushion 19A, the seatback 19B, and the steering wheel 30 as recognized from the pulse numbers of the pulse signals by the first control section 402, the second control section 403, and the third control section 404.

While the vehicle 10 is executing driving assist control of level 3 or level 4, the determination section 406 determines whether or not a positional condition has been satisfied based on the current positions of the seat cushion 19A, the seatback 19B, and the steering wheel 30 as recognized by the first control section 402, the second control section 403, and the third control section 404, and on the reference positions of the seat cushion 19A, the seatback 19B, and the steering wheel 30. More specifically, based on the current positions of the seat cushion 19A, the seatback 19B, and the steering wheel 30 and on the reference positions of the seat cushion 19A, the seatback 19B, and the steering wheel 30, the determination section 406 computes a first return time as a sum total of the times needed to move the seat cushion 19A, the seatback 19B, and the steering wheel 30 to their respective reference positions. This first return time is the sum total of the time to move the seat cushion 19A by the drive force of the first actuator 24, the time to move the seatback 19B by the drive force of the second actuator 27, and the time to move the steering wheel 30 by the drive force of the third actuator 32. Furthermore, a given amount of time is also needed from when the occupant P1 has received a warning, described later, until when the occupant P1 actually starts manual operation of the first switch 25, the second switch 28, and the third switch 33. This time is called "operation preparation time". Moreover, the sum total of the first return time and the operation preparation time is called the "setting return time". This setting return time is, for example, recorded on the ROM 40B or the storage 40D. This setting return time is, for example, 10 seconds. Furthermore, a first threshold, which is a threshold of the first return time, is recorded in the ROM 40B or the storage 40D. The first threshold is, for example, 7 seconds for a setting return time of 10 seconds. The determination section 406 determines the positional condition to be satisfied when the first return time as computed by the determination section 406 is the first threshold or greater. However, the determination section 406 determines that the positional condition is not satisfied when the first return time as computed by the determination section 406 is less than the first threshold.

The display control section 407 controls the display 15.

When the determination section 406 has determined that the positional condition has been satisfied, the restrict control section 408 applies a prescribed restriction to control of the first control section 402, the second control section 403, and the third control section 404. Namely, the restrict control section 408 restricts the first control section 402, the second control section 403, and the third control section 404 from controlling the first actuator 24, the second actuator 27, and the third actuator 32 so as to move the seat cushion 19A, the seatback 19B, and the steering wheel 30 in directions away from their respective reference positions. However, the restrict control section 408 allows the first control section 402, the second control section 403, and the third control section 404 to control the first actuator 24, the second actuator 27, and the third actuator 32 so as to move the seat cushion 19A, the seatback 19B, and the steering wheel 30 in directions toward their respective reference positions.

OPERATION AND ADVANTAGEOUS EFFECTS

Next, description follows regarding the operation and advantageous effects of the present exemplary embodiment.

Figure 5:
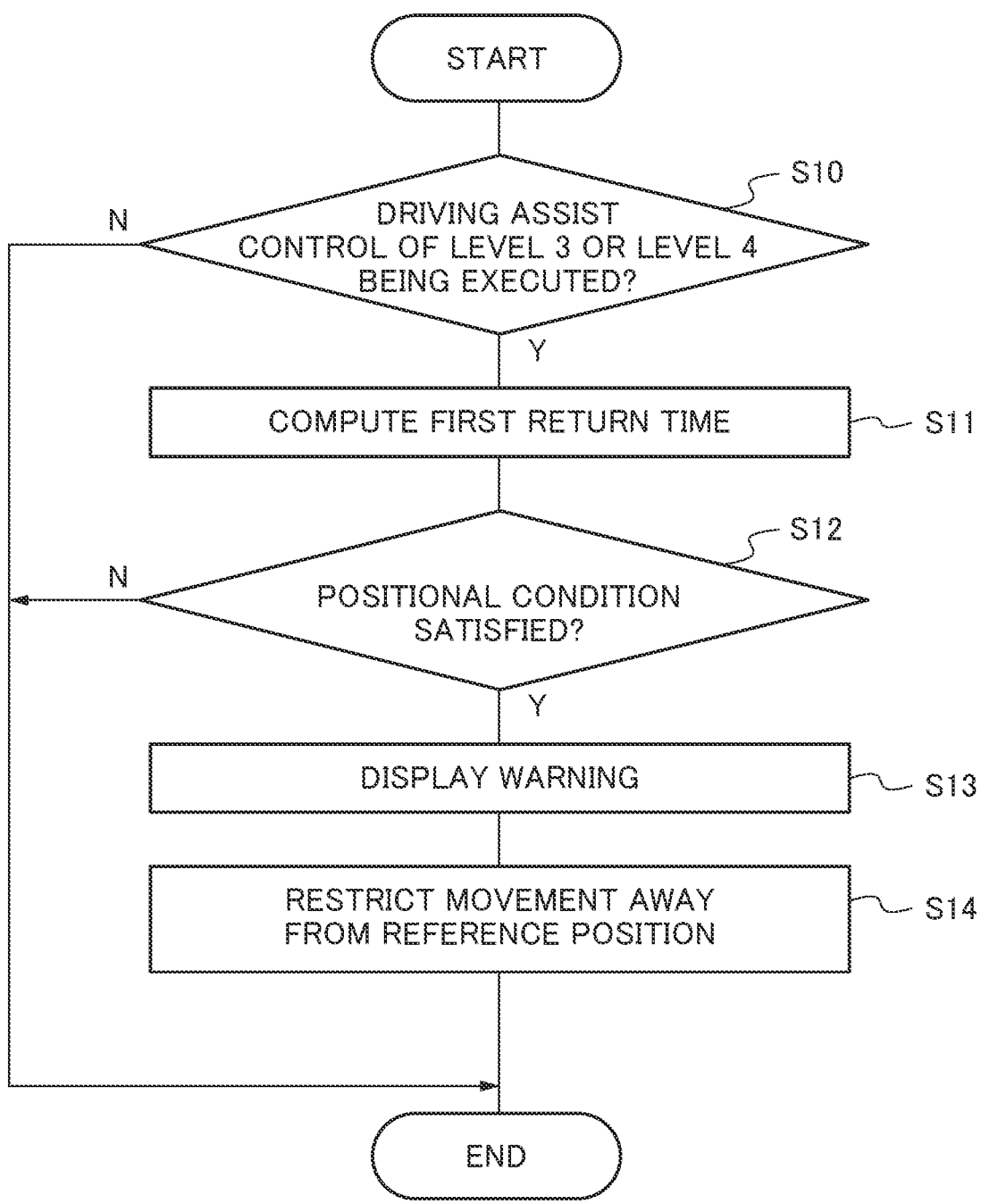
FIG. 5 is a flowchart representing processing performed by the ECU.

The ECU 40 of the vehicle 10 executes the processing of the flowchart of FIG. 5 repeatedly, every time a prescribed period of time has elapsed.

First at step S10 the driving assist control section 401 of the ECU 40 determines whether or not driving assist control of level 3 or level 4 is being executed.

The ECU 40 transitions to step S11 when determined YES at step S10. At step S11 the determination section 406 of the ECU 40 computes the first return time based on the current positions of the seat cushion 19A, the seatback 19B, and the steering wheel 30 and on the reference positions of the seat cushion 19A, the seatback 19B, and the steering wheel 30.

When the processing of step S11 has finished the ECU 40 transitions to step S12 where the determination section 406 determines whether or not the positional condition has been satisfied.

When determined YES at step S12 the ECU 40 transitions to step S13 where the display control section 407 controls the display 15. The display 15 thereby displays text representing a warning to the occupant P1. For example, a message such as "Please return the seat cushion 19A, the seatback 19B, and the steering wheel 30 to their reference positions" is displayed on the display 15.

When the processing of step S13 has finished the ECU 40 transitions to step S14 where the restrict control section 408 restricts the first control section 402, the second control section 403, and the third control section 404 from controlling the first actuator 24, the second actuator 27, and the third actuator 32 so as to move the seat cushion 19A, the seatback 19B, and the steering wheel 30 in directions away from their respective reference positions.

However, text representing a warning to the occupant P1 is not displayed on the display 15 when the ECU 40 determined NO at step S12. Furthermore, in such cases the restrict control section 408 does not apply a restriction to the control of the first control section 402, the second control section 403, and the third control section 404. The occupant P1 is accordingly able to move the seat cushion 19A, the seatback 19B, and the steering wheel 30 in directions away from their respective reference positions using the first switch 25, the second switch 28, and the third switch 33.

The ECU 40 temporarily ends the processing of the flowchart in FIG. 5 when the processing of step S14 has finished, or when determined NO at step S10 or step S12.

In the vehicle 10 of the present exemplary embodiment as described above, the display 15 issues the warning to the occupant P1, who is the driver, when determined that the positional condition has been satisfied based on the reference positions and the current positions of the seat cushion 19A, the seatback 19B, and the steering wheel 30 while driving assist control of level 3 or level 4 is being executed. The occupant P1 receiving the warning is accordingly able to recognize that the distance between the current positions and the reference positions of the seat cushion 19A, the seatback 19B, and the steering wheel 30 has such a size that the positional condition is satisfied. In other words, the occupant P1 is accordingly able to recognize that the first return time, which is the time needed to move the seat cushion 19A, the seatback 19B, and the steering wheel 30 to their respective reference positions, is the first threshold or greater. There is accordingly a high likelihood that after the occupant P1 has received the warning, the occupant P1 will utilize at least one out of the first switch 25, the second switch 28, and the third switch 33 to move at least one out of the seat cushion 19A, the seatback 19B, and the steering wheel 30 in a direction toward their reference positions. The reference positions in the present exemplary embodiment are the positions of the seat cushion 19A, the seatback 19B, and the steering wheel 30 when the vehicle 10 was switched from a non-assisted state to a driving assist state in which driving assist control is being executed. Namely, the positions of the seat cushion 19A, the seatback 19B, and the steering wheel 30 immediately prior to driving assist control being executed are the reference positions of the seat cushion 19A, the seatback 19B, and the steering wheel 30. The positions of the seat cushion 19A, the seatback 19B, and the steering wheel 30 immediately prior to driving assist control being executed are highly likely to be positions that are easy for the occupant P1 to execute manual driving. Thus in cases in which the occupant P1 who has received the warning has then moved the seat cushion 19A, the seatback 19B, and the steering wheel 30 toward their reference positions, the occupant P1 is highly likely to be able to execute manual driving comfortably. Thus the vehicle 10 of the present exemplary embodiment enables quick return of the occupant P1 to a posture enabling manual driving execution when the vehicle 10 has been switched from the driving assist state to the non-assist state.

Moreover, in the present exemplary embodiment, when determined that the positional condition has been satisfied, the seat cushion 19A, the seatback 19B, and the steering wheel 30 are restricted by the ECU 40 (the restrict control section 408) from moving in directions away from their respective reference positions. This means that a likelihood that the occupant P1 is able to quickly return to a posture enabling manual driving execution when the vehicle 10 has been switched from a driving assist state to a non-assist state is higher than cases in which the seat cushion 19A, the seatback 19B, and the steering wheel 30 are able to move in directions away from their reference positions when determined that the positional condition has been satisfied.

This concludes description of the vehicle 10, the vehicle control method, and the non-transitory recording medium according to the present exemplary embodiment, however appropriate design modifications may be made to the vehicle 10, the vehicle control method, and the non-transitory recording medium within a range not departing from the present disclosure.

For example, the reference positions of the seat cushion 19A, the seatback 19B, and the steering wheel 30 may be positions that have been prerecorded in the ROM 40B or the storage 40D of the ECU 40. For example, each of the positions of the seat cushion 19A, the seatback 19B, and the steering wheel 30 may be pre-recorded as respective reference positions in the ROM 40B or the storage 40D of the ECU 40 by the occupant P1 operating a button (image) displayed on the display 15 while in a state in which the occupant P1 has positioned the seat cushion 19A, the seatback 19B, and the steering wheel 30 in personally preferred positions. Then the seat cushion 19A, the seatback 19B, and the steering wheel 30 are moved to their respective reference positions under control of the ECU 40 when the occupant P1 operates a particular button (image) displayed on the display 15 when getting into the vehicle 10. For example, consider a case in which the vehicle 10 is in a non-assist state and with the seat cushion 19A, the seatback 19B, and the steering wheel 30 each at their respective reference positions, and the vehicle 10 is then switched to a driving assist state in which the driving assist control of level 3 or level 4 is executed. In such cases the ECU 40 determines whether or not the positional condition has been satisfied based on the above reference positions. The reference positions of the seat cushion 19A, the seatback 19B, and the steering wheel 30 in such cases are highly likely to be positions from which the occupant P1 is easily able to execute manual driving. Thus in the present modified example too, the occupant P1 is highly likely to be able to execute manual driving comfortably in cases in which the occupant P1 on receiving a warning moves the seat cushion 19A, the seatback 19B, and the steering wheel 30 to their reference positions. Thus in the vehicle 10 of the present exemplary embodiment, the occupant P1 is able to quickly return their posture to a posture enabling manual driving execution when vehicle 10 has switched from a driving assist state to a non-assist state.

Movable members capable of being moved by motive force of the actuators in the present exemplary embodiment are the seat cushion 19A, the seatback 19B, and the steering wheel 30. However, the movable member capable of being moved by motive force of the actuator may be a different member. For example, the movable member capable of being moved by motive force of the actuator may be any one or more selected from the group consisting of the brake pedal 35 capable of moving in a direction intersecting the pedal-depress direction, the accelerator pedal 36 capable of moving in a direction intersecting the pedal-depress direction, the side mirrors 37 capable of rotating with respect to the side doors 11, and the rearview mirror 38 capable of rotating with respect to the vehicle body 14.

Moreover, the ECU 40 (the determination section 406) may also compute a second return time that is a time needed to move a particular movable member that is one movable member from out of plural movable members to a reference position based on the position and the reference position of the particular movable member. For example, the slidable seat cushion 19A may be utilized as the "particular movable member". The second return time is the time to move the particular movable member by drive force of an actuator. The sum total of the second return time and the operation preparation time is the setting return time in such cases. Moreover, in such cases, for example, the ECU 40 determines the positional condition to have been satisfied when the ECU 40 (determination section 406) has determined that the second return time of the seat cushion 19A has reached a second threshold or greater while the vehicle 10 is executing driving assist control of level 3 or level 4. The second threshold is recorded in the ROM 40B or the storage 40D. The second threshold is, for example, 8 seconds for a setting return time of 10 seconds. However, the determination section 406 determines the positional condition has not satisfied when the second return time computed by the determination section 406 is less than the second threshold.

The reference positions of each of the movable members may be unique values for the vehicle 10 set when manufacturing the vehicle 10.

There may also be a single movable member alone.

A position sensor connected to the ECU 40 may be provided in the vicinity of each of the movable members, and the position of each of the movable members may be detected using the position sensor.

One or more of the movable members may be manually operated. Namely, one or more of the movable members may be a member that does not receive drive force from an actuator. In such case the position sensor connected to the ECU 40 may be provided in the vicinity of the manual movable member.

A mechanical stopper to restrict the movable members from moving in a direction away from their reference positions when the positional condition has been satisfied may also be provided to the vehicle 10 as a movement restricting device. For example, a stopper may be provided to the driving seat 16 as a movement restricting device, with the stopper being provided at a position positioned away from a slide path of the upper rails 22 when the positional condition is not satisfied and moving onto the slide path of the upper rails 22 when the positional condition has been satisfied.

The ECU 40 may also estimate the build of the occupant based on imaging data from a camera provided inside the vehicle and imaging the occupant seated in the driving seat 16. The ECU 40 may then determine the reference position of each of the movable members based on the estimated build.

An alarm device other than the display 15 may issue the warning when the positional condition has been satisfied. For example, a speaker (not illustrated in the drawings) provided to the vehicle 10 may be employed as an alarm device. In such cases, the speaker emits a voice message to the occupant urging the occupant to move each of the movable members toward their reference positions when the positional condition has been satisfied. Moreover, a display and/or a speaker of a portable terminal carried by the occupant (e.g. a smartphone) may be employed as the alarm device.

In the vehicle cabin 14A the position of the driving seat 16 and the steering wheel 30 in the vehicle width direction may be on the right side or the left side of a vehicle width direction central portion.

What is claimed is:

1. A vehicle comprising:
   at least two movable members whose positions are changeable by an occupant of the vehicle,
   a driving assist system configured to execute driving assist control that is interruptible when an interrupt condition has been satisfied; and
   a processor configured to:
   control an alarm device to issue a warning to a driver of the vehicle when the processor has determined that a prescribed positional condition has been satisfied based on (i) a reference position and (ii) a current position of each of the at least two movable members when the driving assist control is being executed, wherein the processor determines that the prescribed positional condition has been satisfied by:
      computing a first return time that is a sum of times needed to move each individual movable member of the at least two movable members to its respective reference position based on the current position and the reference position of each of the individual movable members of the at least two movable members; and
      determining that the positional condition has been satisfied when the processor has determined that the first return time is equal to or greater than a first threshold while the driving assist control is being executed.

2. The vehicle of claim 1, wherein the processor is configured to:
   compute a second return time based on a position and a reference position of a particular movable member that is one movable member of the at least two movable members, the second return time being a time needed to move the particular movable member to the reference position of the particular movable member; and
   determine that the prescribed positional condition has been satisfied when it the processor has determined that the second return time is equal to or greater than a second threshold while the driving assist control is being executed.

3. The vehicle of claim 1, further comprising a movement restricting device configured to restrict each of the at least two movable members from moving in a direction away from its respective reference position when the processor has determined that the prescribed positional condition has been satisfied.

4. The vehicle of claim 1, wherein the at least two movable members are at least two selected from the group consisting of: a seat cushion of a driving seat that is able to slide with respect to a vehicle body of the vehicle; a seatback connected to a seat cushion of the driving seat so as to be able to rotate; a steering wheel that is able to move along its own rotation center axis; a brake pedal that is able to move in a direction intersecting a pedal-depress direction; an accelerator pedal that is able to move in a direction intersecting the pedal-depress direction; a side mirror that is able to move with respect to the vehicle body; and a rearview mirror that is able to move with respect to the vehicle body.

5. The vehicle of claim 1, wherein the reference position is a position of each of the at least two movable members when the vehicle was switched from a non-assist state in which the driving assist control is not being executed to a driving assist state in which the driving assist control is being executed.

6. The vehicle of claim 1, wherein:
   each of the at least two movable members is configured to move under drive force of an actuator controlled by the processor; and
   the reference position is a pre-recorded position to which each of the at least two movable members is moved under the drive force of the actuator when an operation device provided at the vehicle has been operated by the occupant of the vehicle.

7. A vehicle control method of controlling a vehicle that includes at least two movable members whose positions are changeable by an occupant of the vehicle, the method being performed by a processor and comprising:
   when the vehicle is executing driving assist control that is interruptible when an interrupt condition has been satisfied, controlling an alarm device to issue a warning to a driver of the vehicle when the processor has determined that a prescribed positional condition has been satisfied based on a current position and a reference position of each of the at least two movable members, the processor determining that the prescribed positional condition has been satisfied by:
      computing a first return time that is a sum of times needed to move each individual movable member of the at least two movable members to its respective reference position based on the current position and the reference position of each of the individual movable members of the at least two movable members; and
      determining that the positional condition has been satisfied when the processor has determined that the first return time is equal to or greater than a first threshold while the driving assist control is being executed.

8. A non-transitory recording medium storing a computer-executable program executable by a processor to perform processing that controls a vehicle having at least two movable members whose positions are changeable by an occupant of the vehicle, the processing comprising:
   when the vehicle is executing driving assist control that is interruptible when an interrupt condition has been satisfied, controlling an alarm device to issue a warning to a driver of the vehicle when the processor has determined that a prescribed positional condition has been satisfied based on a current position and a reference position of each of the at least two movable members, the processor determining that the prescribed positional condition has been satisfied by:

computing a first return time that is a sum of times needed to move each individual movable member of the at least two movable members to its respective reference position based on the current position and the reference position of each of the individual movable members of the at least two movable members; and determining that the positional condition has been satisfied when the processor has determined that the first return time is equal to or greater than a first threshold while the driving assist control is being executed.

\* \* \* \* \*